Patented Jan. 29, 1946

2,393,652

UNITED STATES PATENT OFFICE 2,393,652

PRODUCTION OF COLORED TEXTILE AND OTHER MATERIALS

Henry Charles Olpin, Edmund Stanley, and Christopher Stanley Argyle, Spondon, near Derby, England, assignors to British Celanese Limited, London, England, a company of Great Britain No Drawing. Application June 27, 1942, Serial No. 448,833. In Great Britain July 25, 1941

14 Claims. (Cl. 106—193)

This invention relates to the production of colored fibres, foils, and other shaped articles, for example films, of cellulose acetate or other cellulose esters or ethers or of other film-forming materials, for example polymerised vinyl compounds, which are soluble in organic liquids.

According to the present invention such colored fibres, foils, and other shaped articles are prepared by shaping into the desired form and then setting a solution of the film-forming material, the said solution being colored with a dye having therein an aliphatic radicle containing at least 8 carbon atoms, and particularly an aliphatic hydrocarbon radicle of this kind. Advantageously the aliphatic radicle contains at least 11 carbon atoms. The said aliphatic radicles can be either saturated or unsaturated. Examples of such radicles are octyl, dodecyl, hexadecyl, octodecyl, and octodecenyl, that is the hydrocarbon radicle of oleyl alcohol. Preferably the dyes are free from sulphonic and carboxylic groups. In this way it is possible to produce colored products which are very fast to washing and from which very little color bleeds on to wool, cotton, or other textile material subjected to scouring or other aqueous treatment in contact therewith.

Further it is possible to produce colored artificial fibres of cellulose acetate or other film-forming materials which are bright in shade and lack the undesirable "greasy" appearance which so very often characterises artificial fibres spun from solutions colored with pigments.

These new colored products cannot be obtained by conventional dyeing methods using aqueous dispersions of the dyes having therein aliphatic radicles containing at least 8 carbon atoms since the said dyes have little or no affinity for cellulose acetate and other cellulose ester or ether materials under these conditions.

The aliphatic radicle containing at least 8 carbon atoms can be united to an aryl nucleus of the dye in any of a variety of ways. For example, it can be united thereto directly or, by means of an —$NR_1$— group ($R_1$ is hydrogen or an organic radicle), an oxygen atom, a sulphur atom, a —$CONR_1$— group, a —$CO.O$— group, a —$CO$— group, or an —$SO_2.NR_1$— group. Thus the dye can have attached to an aryl nucleus one of the following groupings in which R is an aliphatic radicle containing at least 8 carbon atoms: $R.N(R_1)$—, R—O—, R—S—, $R.CO.N(R_1)$—, $R.N(R_1)$ — CO —, $R.NH.SO_2$ —, $R.CO.O$ —, R.O.CO—, R.CO—. In these groupings $R_1$ represents hydrogen or an organic substituent e. g. an alkyl group containing less than 8 carbon atoms, for instance methyl or ethyl.

The dyes can be of various types, for example they can be azo dyes containing one, two or more azo groups, anthraquinone dyes, or dyes of the nitro-diarylamine series. The following are examples of dyes which can be employed.

Azo dyes 4-stearoylamino- 4'- dimethylamino - azobenzene (yellow)

4-dodecyloxy-4'-diethylamino - azobenzene (yellow)

4-nitro-4'-diethylamino- 2'- stearoylamino - azobenzene (red)

4-stearoylamino-2'-hydroxy-5'- phenyl - azobenzene (yellow)

4-(p-nitrobenzeneazo) -2:5-dimethoxy - 4'-diethylamino-2'-stearoylamino - azobenzene (navy blue)

4-(p-nitrobenzeneazo) -2-acetylamino - 5 - methoxy-4'-diethylamino-2'-stearoylamino-azobenzene (greenish navy blue)

4-octodecyl-4'-diethylamino-azobenzene (yellow)

4-(4'-octodecylbenzene-azo) - 1 - phenyl-3-methyl-5-pyrazolone (yellow)

Dodecylester of 4-carboxy-4'-diethylamino-azobenzene (yellow)

Azo dye obtainable by coupling diazotised 2-aminobenzthiazole with m-stearoylamino-diethylaniline (bluish-red)

Azo dye from diazotised p-dodecylaniline and 1-(2':5'-dichlor-4'-sulphophenyl)-3-methyl-5-pyrazolone (yellow)

Azo dye obtainable by coupling diazotised 6-methyl- or 6-methoxy-2-aminobenzthiazole with cresidine and rediazotising and coupling with 3-stearoylamino-1-diethyl-amino-benzene

Anthraquinone dyes 1-stearoylamino-4-anilido-anthraquinone (violet)

1-stearoylamino - 4 - (o - methoxyphenylamino) - anthraquinone (blue-violet)

1-amino-4-(p-dodecylphenylamino) - anthraquinone (blue)

1-amino-4 (p-dodecyloxyphenylamino) - anthraquinone (blue)

1-amino-4(p-dodecylmercaptophenylamino) -anthraquinone (blue)

1-amino-4-phenylamino-2 - dodecyloxy - anthraquinone (violet)

1-amino-4-phenylamino-2-dodecylmercapto -anthaquinone (blue-violet)

1-amino-4-phenylamino-anthraquinone-2-carboxylic-dodecylamide (blue)
1-amino-4-(4'-dodecyl-phenylamino)-anthraquinone-2-sulphonic acid (blue)

Nitro-diarylamine dyes 2-nitro-4'-octodecyl-diphenylamine (yellow)
4-chlor-2-nitro-4'-octodecyl-diphenylamine (golden-yellow)
4-chlor-2-nitro-4'-dodecyl-diphenylamine (golden-yellow).

The dyes can be employed mixed with one another or mixed with dyes of other types if desired.

The dyes can be made from appropriate components containing the requisite aliphatic radicals. For example, azo dyes can be obtained by coupling various coupling components (e. g. phenols, amines or pyrazolones) with diazo compounds of amines having aliphatic groups, containing at least 8 carbon atoms, attached thereto in any of the ways indicated above. Again azo dyes can be prepared from coupling components containing the said aliphatic groups. For instance, monoazo dyes can be produced from diazotized aniline or a nitro, halogen, alkyl, alkoxy or other substitution product thereof, by coupling with an N-dialkyl or other N-substituted aniline capable of coupling in para-position to the amino group and having, as a substituent in meta-position to the substituted amino group, an amino group acidylated with an aliphatic acid containing at least 9 carbon atoms. Such a coupling component is 3-stearoylamino-1-diethylaminobenzene (obtainable by the action of stearic acid chloride on 3-amino-1-diethylamino-benzene). Again the same coupling components can be coupled with diazo compounds of amino-azo compounds in order to prepare polyazo dyes. Suitable diazotisable amino azo compounds are those referred to in U. S. Patent No. 2,289,413. Disazo and other polyazo dyes of this kind derived from N-substituted anilines containing, in meta-position to the N-substitution amino group, an amino group acidylated with an aliphatic acyl residue containing at least 9 carbon atoms are more particularly described in companion U. S. application S. No. 448,834, filed June 27, 1942. Some azo dyes of these kinds which can be employed are described in companion U. S. applications S. Nos. 448,830, 448,831 and 448,832 filed June 27, 1942.

Likewise nitro-diarylamine dyes can be made by interaction of a halogen aryl compound and an aminoaryl compound, at least one of which contains an aliphatic radicle having at least 8 carbon atoms. Thus 2-nitro-4'-octodecyl-diphenylamine can be prepared by the interaction of 1-chlor-2-nitrobenzene and p-octodecylamine.

Again the aliphatic group containing at least 8 carbon atoms can be introduced into a dye containing an amino group, a hydroxy group or a mercapto group by the action of an appropriate alkylating or acidylating agent, for example an alkyl halide containing at least 8 carbon atoms, e. g. dodecyl chloride or octodecyl chloride, or a halide of an aliphatic acid containing at least 8 carbon atoms, e. g. the chlorides of lauric acid, palmitic acid or stearic acid. Further a dye containing a carboxylic group can be esterified with an aliphatic radicle containing at least 8 carbon atoms by the action of an aliphatic alcohol containing at least 8 carbon atoms, e. g. dodecyl alcohol, oleyl alcohol, or octodecyl alcohol. Likewise the carboxylic group can be converted, directly or in the form of a halide or ester, into an amide, having attached to the amide nitrogen an aliphatic radicle containing at least 8 carbon atoms, by the action of an aliphatic amine containing at least 8 carbon atoms, e. g. dodecylamine or octodecylamine.

The dyes utilised in accordance with the invention have, as a class, good solubility in organic liquids, particularly acetone. It is possible therefore to have dissolved in the fibre-, foil-, or film-forming solution sufficient dye for products colored in full shades to be obtained on shaping and setting the solutions into fibres or films.

Where the dye is soluble to the requisite extent in the acetone or other solvent used to prepare the solution of the film-forming material it may be simply mixed with the said solvent before, during, or after effecting solution of the film-forming material. Where the dye is not soluble to the extent necessary to produce the required depth of shade the part thereof which is not dissolved should be in very finely divided state. For example the dyes may be finely milled and intimately mixed with the solution of the film-forming material. The milling is advantageously effected in the presence of a portion of the solvent for the film-forming material and with or without addition of a portion of the film-forming material. A particularly satisfactory way of reducing the dyestuff to the requisite fine state of dispersion is to work it, e. g. by kneading, rolling or the like, together with film-forming material and sufficient solvent for the latter to form a dough, the mechanical treatment being continued while evaporating solvent until the product can be ground to powder. After grinding, the product can be incorporated with the requisite solvent and such further quantity of film-forming material as may be necessary.

The proportions in which the dyes are employed can be within wide limits, for example from 0.05 per cent to 1.5 per cent based on the weight of the cellulose acetate or other film-forming material. Products containing from 0.1 per cent to 1 per cent or more are especially useful.

Either wet or dry methods may be used for the setting of the solutions of the film-forming materials containing the dyes so as to produce fibres, films and the like; for instance fibres may be produced by spinning the solutions either into suitable evaporative atmospheres or into suitable coagulating baths. Again, colored foils or films can be produced by casting the solutions on film-forming devices of the wheel or band type, effecting setting by evaporation of the solvent, and stripping the foil or film from the wheel or band. The invention is, however, of especial value in connection with the production of colored cellulose acetate fibres by the spinning of acetone solutions of cellulose acetate.

The fibres may of course be assembled into yarns at the time of spinning as is commonly practiced. Again the fibres may be cut up into staple fibre and this, either alone or mixed with other textile fibres, e. g. wool, silk, cotton, or regenerated cellulose fibres, converted into yarn by the methods commonly employed for converting cotton or wool into yarns. Yarns consisting of or containing the colored fibres of the invention can be formed into fabrics by weaving or knitting.

The colored materials produced in accordance with the invention may subsequently be topped with other dyes and particularly with direct dyeing dyes for cellulose esters or ethers, for example the water-insoluble dyestuffs of the nitro-diarylamine, azo, or amino anthraquinone series, such as are extensively employed for the coloration of cellulose acetate materials. The topping coloring matter may be applied either uniformly or locally according to the effects it is desired to produce. The topping colors may be applied, for instance, in aqueous solution or dispersion according to their nature, or in solution in organic solvents as described, for example, in U. S. Patents Nos. 1,738,978 and 1,927,145 and British Patent No. 460,575. A single colored material produced in accordance with the invention can thus be utilised to yield a range of materials of different shades.

As mentioned above the aforementioned dyes containing aliphatic groups having at least 8 carbon atoms have as a class little or no affinity for fibres, foils, films and the like of cellulose esters or ethers or other film-forming materials when applied thereto in the ordinary way as aqueous dispersions. It has been found, however, that valuable colorations can be obtained by applying the dyes in the form of solutions in organic liquid media. The organic liquid media can be those referred to in co-pending U. S. application S. No. 448,165, filed June 23, 1942, in connection with the employment of arylamino-anthraquinones for coloring cellulose ester or ether materials. Again the dye liquids can be applied to the materials in any of the ways described in the said U. S. application S. No. 448,165.

The invention is of especial value in the production of colored cellulose acetate fibres, foils, films and the like. Similar colored shaped articles of other film-forming materials soluble in organic liquids, particularly other cellulose esters or ethers, can be obtained likewise, for example articles of cellulose propionate, butyrate, acetopropionate, acetobutyrate, nitro-acetate, and of methyl, ethyl and benzyl celluloses, and articles of polymerised vinyl compounds. In the appended claims the term "organic derivative of cellulose" is used to denote cellulose esters and cellulose ethers.

The invention is illustrated by the following examples:

Example I

To a cellulose acetate spinning dope prepared from 25 parts of cellulose acetate and 75 parts of acetone is added 0.1 part of 4-nitro-4'-diethylamino-2'-stearoylamino-azobenzene. The dye readily dissolves to give a colored solution which is then spun into yarn by extrusion through a series of fine orifices and evaporation of the solvent in a current of warm air. Lustrous yarn having a light red shade is thus obtained. The coloration is of good fastness to light and very resistant to removal by hot soap solutions.

Example II 100 parts of a spinning dope similar to that described in Example I are stirred with 0.25 part of 4-(p-nitrobenzeneazo)-2:5-dimethoxy-4'-diethylamino-2'-stearoylamino-azobenzene until complete solution of the dyestuff. This is then spun as before giving a navy blue yarn, free from any "greasy" appearance, having good fastness to light and very good fastness to scouring and cross-dyeing.

Example III 0.3 part of 1-stearoylamino-4-anilido-anthraquinone is dissolved in 100 parts of an acetone solution of cellulose acetate containing 25 parts of the latter and the mixture spun as before. A rich violet yarn is obtained which has good fastness to light and to laundering treatments.

Example IV

To obtain a yellow colored yarn 0.25 part of 2:4-dinitro-4'-octodecyl-diphenylamine is stirred with 100 parts of a 25% acetone solution of cellulose acetate and spun into filaments in the usual manner. A clear yellow lustrous yarn is obtained having very good fastness to wet processing.

Example V

A colored cellulose acetate yarn is spun containing 1.5% of the azo dyestuff 4-nitro-4'-diethylamino - 2'-stearoylamino-azobenzene. 100 lbs. of this deep red yarn are hanked and dyed from a 40:1 bath set with 0.5 g. p. l. soap, 2 cc. p. l. of a mixture of 1 part xylene with 9 parts of turkey-red-oil, and 2% of a 10% paste of 1:4-di(methylamino)-anthraquinone, based on the weight of the yarn. Dyeing is conducted for 1½ hours at a temperature of 75° C. after which the yarn is washed off, given a suitable finish, allowed to drain and dried.

The finished material is a rich wine shade of good fastness to wet processing.

Having described our invention what we desire to secure by Letters Patent is:

1. Fibers of organic fiber-forming materials soluble in organic liquids, said fibers being colored with a dye having therein a monovalent aliphatic radicle which is free from sulphonic and carboxylic groups and contains at least 8 carbon atoms united by carbon to carbon linkages.

2. Fibers of an organic derivative of cellulose colored with a dye having therein a monovalent aliphatic radicle which is free from sulphonic and carboxylic groups and contains at least 8 carbon atoms united by carbon to carbon linkages.

3. Cellulose acetate fibers colored with a dye having therein a monovalent aliphatic radicle which is free from sulphonic and carboxylic groups and contains at least 8 carbon atoms united by carbon to carbon linkages.

4. Cellulose acetate fibers colored with a dye having therein a monovalent aliphatic hydrocarbon radicle which is free from sulphonic and carboxylic groups and contains at least 8 carbon atoms united by carbon to carbon linkages.

5. Cellulose acetate fibers colored with an azo dye having therein a monovalent aliphatic radicle which is free from sulphonic and carboxylic groups and contains at least 8 carbon atoms united by carbon to carbon linkages.

6. Cellulose acetate fibers colored with an azo dye having therein a monovalent aliphatic radicle which is free from sulphonic and carboxylic groups and contains at least 8 carbon atoms united by carbon to carbon linkages, said aliphatic radicle being present in the form of a group —NH.CO—R where R is the aliphatic radicle, the said group being attached directly to an aryl nucleus of the dye.

7. Cellulose acetate fibers colored with an azo dye having therein a monovalent aliphatic radicle which is free from sulphonic and carboxylic groups and contains at least 8 carbon atoms united by carbon to carbon linkages, said aliphatic radicle being present in the form of a group —OR where R is the aliphatic radicle, the said group being attached directly to an aryl nucleus of the dye.

8. Cellulose acetate fibers colored with an azo dye having therein a monovalent aliphatic radicle which is free from sulphonic and carboxylic groups and contains at least 8 carbon atoms united by carbon to carbon linkages, said aliphatic radicle being present in the form of a group —COOR where R is the aliphatic radicle, the said group being attached directly to an aryl nucleus of the dye.

9. Cellulose acetate fibers colored with an azo dye obtainable by coupling a diazo compound with an N-dialkylaniline capable of coupling in para-position to the amino group and having in meta-position to the dialkylamino group an amino group acidylated with the acidyl group of a fatty acid containing at least 9 carbon atoms.

10. Cellulose acetate fibers colored with an azo dye obtainable by coupling a diazotized aminoazo compound with an N-dialkyl-aniline capable of coupling in para-position to the amino group and having in meta-position to the dialkylamino group an amino group acidylated with the acidyl group of a fatty acid containing at least 9 carbon atoms.

11. Cellulose acetate fibers colored with 4-(p-nitrobenzeneazo) - 2:5-dimethoxy-4'-diethylamino-2'-stearolyamino-azobenzene.

12. In the production of colored fibers of an organic fiber-forming material soluble in organic solvents by spinning a colored solution of the said fiber-forming material, the step of incorporating in said solution a dye having therein a monovalent aliphatic radicle which is free from sulphonic and carboxylic groups and contains at least 8 carbon atoms united by carbon to carbon linkages.

13. In the production of colored fibers of an organic derivative of cellulose by spinning a colored solution of said organic derivative of cellulose, the step of incorporating in said solution a dye having therein a monovalent aliphatic radicle which is free from sulphonic and carboxylic groups and contains at least 8 carbon atoms united by carbon to carbon linkages.

14. In the production of colored fibers of cellulose acetate by spinning a colored solution of organic derivative of cellulose, the step of incorporating in said solution a dye having therein a monovalent aliphatic radicle which is free from sulphonic and carboxylic groups and contains at least 8 carbon atoms united by carbon to carbon linkages.

HENRY CHARLES OLPIN.
EDMUND STANLEY.
CHRISTOPHER STANLEY ARGYLE.